(12) United States Patent
Fugaro et al.

(10) Patent No.: US 8,027,592 B2
(45) Date of Patent: Sep. 27, 2011

(54) INFRARED REMOTE CONTROL SIGNALING GENERATOR

(75) Inventors: Anthony Fugaro, Holly Springs, NC (US); Jeff Scott, Apex, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 836 days.

(21) Appl. No.: 11/963,744

(22) Filed: Dec. 21, 2007

(65) Prior Publication Data

US 2009/0024865 A1    Jan. 22, 2009

Related U.S. Application Data

(60) Provisional application No. 60/950,899, filed on Jul. 20, 2007.

(51) Int. Cl.
    *H04B 10/04*    (2006.01)
(52) U.S. Cl. .................................... 398/189; 398/106
(58) Field of Classification Search .............. 398/106, 398/189–191
    See application file for complete search history.

(56) References Cited

U.S. PATENT DOCUMENTS

| | | | |
|---|---|---|---|
| 5,917,631 A * | 6/1999 | Shafer ........................... | 398/106 |
| 6,433,645 B1 * | 8/2002 | Mann et al. ..................... | 331/18 |
| 6,476,947 B1 | 11/2002 | Harvey | |
| 6,651,201 B1 | 11/2003 | Adams et al. | |
| 2001/0055132 A1 * | 12/2001 | Oshima et al. ................. | 359/109 |

FOREIGN PATENT DOCUMENTS

| EP | 1571636 | * | 7/2005 |
|---|---|---|---|
| EP | 1 571 636 A1 | | 9/2005 |

OTHER PUBLICATIONS

PCT International Preliminary Report on Patentability, mailed Nov. 20, 2009, in connection with International Application No. PCT/EP2008/059036.
PCT International Search Report, mailed Dec. 4, 2008, in connection with related International Application No. PCT/EP2008/059036.
PCT Written Opinion, mailed Dec. 4, 2008, in connection with related International Application No. PCT/EP2008/059036.
TMS320DM646x DMSoC Universal Asynchronous Receiver/Transmitter (UART)—User's Guide, Literature Number: SPRUER6, Dec. 2007, Texas Instruments, <http://focus.ti.com/lit/ug/spruer6/spruer6.pdf>, pp. 1-92.

* cited by examiner

*Primary Examiner* — Nathan Curs
(74) *Attorney, Agent, or Firm* — Potomac Patent Group PLLC

(57) ABSTRACT

An IR signaling generator and method divides the functionality of generation between software and hardware to provide a flexible way to generate IR signals, such as remote control signals. The hardware includes a clock generator for generating a carrier clock signal and a data clock signal, a buffer memory that is loaded with instructions representing an encoded data sequence; a control circuit, and a transmitter including a modulator. Each instruction contains an on/off value that is to be modulated with the data clock signal and a pulse duration value that indicates how long the on/off value is to modulate the clock signal. Using the data clock signal, the control circuit measures the amount of time the on/off value modulates the clock signal and causes the buffer to advance to the next instruction in the sequence when the measured amount of time is equal to the pulse duration value.

10 Claims, 5 Drawing Sheets

INFRARED REMOTE CONTROL SIGNALING GENERATOR

FIELD OF THE INVENTION

The present invention relates to signal generation systems and methods, and more particularly, to a method and system for generating infrared signals.

BACKGROUND

Many consumer electronics items such as televisions, set-top boxes, audio/video components, and media center PCs use some form of infrared (IR) signaling for remote control. The signaling is typically accomplished by modulating an infrared light-emitting diode (LED) on and off in a unique pattern such that an IR receiver on the controlled equipment can detect specific commands such as on and off, volume up/down, channel up/down, and the like. More specifically, the IR LED is modulated at a specified carrier frequency, typically in the range of 30 KHz to 60 KHz. This carrier frequency is then switched on and off according to an encoded sequence of binary digits that form the unique controller codes.

There are no widely accepted official industry standards governing how the IR LED is to be modulated or how the data is to be encoded. In practice, various types of encoding are used by the different manufacturers of the controlled equipment. FIGS. 1a-1c show three types of encoding currently used in some equipment. FIG. 1a illustrates pulse-width encoding in which a long period of carrier frequency may represent a binary "1," and a short period may represent a "0." For example, the bit time for a Logic 1 can be defined as 1.5 times the bit time for a Logic 0. Another type of encoding is bi-phase encoding, such as shown in FIG. 1b, in which one half of the bit time is modulated on and the other half is off. In bi-phase encoding, binary values are differentiated by which half of the bit time is "on," that is, a binary "1" may be represented by "off" followed by "on," and vice-versa for binary "0." A third type of encoding, shown in FIG. 1c, is called pulse-position encoding, in which the time between pulses of a constant duration determines the logical value. For example, the bit time for a Logic 1 can be defined as twice that for a Logic 0. There are other less common encoding schemes that exist in the industry that, for reasons of brevity, are not detailed here.

Again, because there are no widely accepted standards, each manufacturer implements its own specific command sequence. For example, FIGS. 2a-2d show the Phillips RC5 IR Remote Control Protocol, which is a commonly used bi-phase encoding scheme and command structure. In the Phillips protocol, a carrier clock having a frequency of 36 KHz, as schematically depicted in FIG. 2a, is modulated using bi-phase data, such as the logic "0" and logic "1" data signal shown in FIG. 2b. The result of the modulation is shown in FIG. 2c, which shows the data modulated clock signal representing a logic "0" bit and logic "1" bit. Such logical bit representations may be combined into a string of bi-phase data to create a command sequence that is provided to an infrared LED.

FIG. 2d depicts an exemplary fourteen-bit command sequence using the Phillips protocol. The command typically includes "Start" bits S1 and S2 (Bit 1-Bit 2) that mark its beginning, a "Toggle" bit T (Bit 3) for repeated commands, a sequence of five bits that represent the device address (Bit 4-Bit 8), followed by a sequence of bits that represent the command itself (Bit 9-Bit 14). Although not shown in FIG. 2d, a "Stop" bit may sometimes follow the command to indicate the end of the command sequence. The device address allows a single remote control to communicate with multiple devices, such as a TV, VCR, set-top box, audio components etc., and the command represents a specific function of the device, such as "play," "channel up," "volume down" etc. associated with the device.

The typical electronic hardware implementation of a remote control device is simply a small, embedded microcontroller that controls a single I/O pin that turns an IR LED on and off based on user inputs from a keypad. All of the encoding, modulation, and command sequencing is done in firmware loaded onto the microcontroller. This is an inexpensive, low power, and reasonably flexible solution for a dedicated-use remote control device.

One existing hardware solution by Texas Instruments (TI) is described in Section 2.4.4 of "TMS320DM646x DMSoC Universal Asynchronous Receiver/Transmitter (UART)" (http://focus.ti.com/lit/ug/spruer6/spruer6.pdf). This approach generates the carrier frequency using a clock divider, generates a bit clock using another clock divider, and loads a series of bits into a shift register to represent the "on" and "off" pulses based on a single period of the bit clock. Although this implementation would be reasonable for the bi-phase encoding shown in FIGS. 2a-2d, it is limited in its capability for handling other encodings, such as pulse-width and pulse-position encoding.

The typical hardware solutions for a dedicated-use IR remote controller are not practical for a highly integrated, multi-use, portable communications and computing device. Simply adding a dedicated microcontroller loaded with the modulation and encoding firmware would violate the space, power, and cost constraints of such a device. An alternative solution might be to load the modulation and encoding firmware onto the portable device's existing microprocessor and have it control an IR LED (which often already exists on these devices) through an I/O pin. However, controlling a single pin with this level of precision is not an efficient use of the device's processor. This is especially so in multi-use devices that must control a number of different things simultaneously (e.g., maintaining a communications link with a cellular base station along with a user application such as email or Internet browser), where a large portion of the processor's power would be consumed modulating a single pin.

While the existing TI approach provides more functionality in hardware and significantly off-loads the microprocessor, it remains limited in configuring the bit clock for encoding schemes that use varying pulse widths. For a scheme that requires varying pulse widths with a fine degree of granularity with respect to the bit period, or a scheme that does not have a constant bit period, the bit clock must be programmed to be a much higher rate, therefore multiplying the number of bits that must be loaded by the microprocessor into the shift register. This greatly increases the real-time constraints on the microprocessor, which, in turn, may affect performance of other applications that may be concurrently running.

Another potential solution would be to implement the entire IR signal generating functionality, including the data encoding, in logic gates. The logic design for such an implementation would be relatively straightforward because none of the schemes currently in use are very complex. However, because there is no single standard, all the existing protocols would have to be implemented individually. This would lead to inflexible and/or expensive IR signaling generator implementations. For example, in devices that typically use Application Specific Integrated Circuit (ASIC) technology, such as cellular phones and personal digital assistants (PDAs), the IR signaling generation function would become fixed once a design of the ASIC device is finalized. Also, because implementing multiple IR remote control standards would utilize a large number of ASIC gates, the cost of the ASIC would increase significantly.

SUMMARY

In accordance with embodiments of the invention, an improved infrared signaling generator and method obviates at least some of the above disadvantages. In one aspect, an IR signaling generator and method divides the functionality of generation between software and hardware to provide a flexible way to generate IR signals, such as remote control command signals. The hardware includes a clock generator for generating a carrier clock signal and a data clock signal, a buffer memory that is loaded with instructions representing an encoded data sequence; a control circuit, and a transmitter including a modulator. Each instruction contains a corresponding on/off value that is to be modulated with the data clock signal and information corresponding to pulse duration value that indicates how long the on/off value is to modulate the clock signal. Using the data clock signal, the control circuit measures the amount of time the on/off value modulates the clock signal and causes the buffer to advance to the next instruction in the sequence when the measured amount of time is equal to the pulse duration value.

In another aspect, an infrared (IR) signal generating apparatus includes a clock generator for generating a carrier clock and a data clock. The generated data clock has a frequency equal to or less than a frequency of the carrier clock. The generating function includes a buffer memory for loading instructions for execution. Each of these instructions produces a sequential part of an encoded data sequence and includes a corresponding value indicating an on or off value for modulating the carrier clock and information corresponding to a pulse duration value. A modulator receives the carrier clock signal and the on or off value during execution of each said instruction and modulates the carrier clock signal with the on or off value. The modulated carrier clock output from the modulator is provided to an IR emitter.

The IR signal generating apparatus also includes a control circuit that receives the pulse duration signal and data clock signal and permits the modulator to modulate the carrier only for the length of time indicated by the pulse duration value as measured using the data clock signal.

In yet another aspect of the invention, an IR signal is produced by generating a carrier clock signal of one frequency and a data clock signal having a frequency less than or equal to that of the carrier clock. A plurality of instructions to be performed in sequential order are loaded into a buffer. Each of these instructions may produce an encoded datum in a sequence of encoded data and includes a corresponding value indicating an on or off value for modulating the carrier clock and information corresponding to a pulse duration value.

Each instruction executes in the sequential order, and the corresponding pulse duration value is applied to a control circuit that permits the modulation only for a length of time indicated by the pulse duration value as measured using the data clock signal. The carrier clock signal is modulated with the corresponding on or off value for the indicated length of time, and the modulated carrier clock signal is provided to an IR emitter.

In another aspect of the invention, each instruction further comprises validity information indicating whether that instruction is valid. The validity information is provided to the control circuit, which determines whether the validity information for the instruction being executed indicates that the instruction is invalid, and if so, the control circuit disables modulation of the carrier clock signal.

It is to be understood that both the foregoing general description and the following detailed description are exemplary and exemplary only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

Figure 1A:
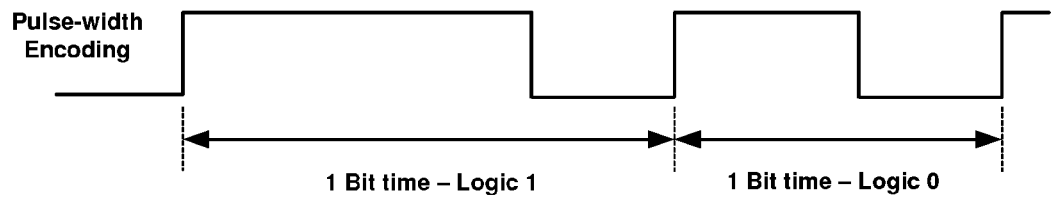
FIGS. 1a-1c are diagrams of exemplary infrared signaling encoding schemes in accordance with some embodiments.
Figure 1B:
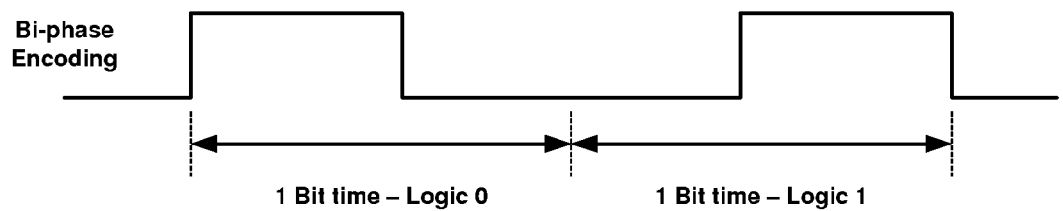

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art.

Many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions, such as program modules, being executed by one or more processors, or by a combination of both. Moreover, the invention can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium would include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information. Thus, the various aspects of the invention may be embodied in many different forms, and all such forms are contemplated to be within the scope of the invention.

The phrase "finite state machine" (FSM) is defined herein to be any device based on a model of computation consisting of a set of states, a start state, an input alphabet, and a transition function that maps input symbols and current states to a next state. Computation begins at the start state, and upon receiving an input string (e.g., an instruction or command), the FSM changes to new states depending on the transition function. While a FSM may not include an arithmetic logic unit (ALU) or other circuits conventionally associated with microprocessors, the term FSM as defined herein does not exclude devices including such circuitry or elements.

Furthermore, it should be emphasized that the terms "comprises" and "comprising," when used in this specification, are taken to specify the presence of stated features, integers, steps or components; but the use of these terms does not preclude the presence or addition of one or more other features, integers, steps, components or groups thereof.

The present invention provides flexible and/or enhanced infrared (IR) remote control functionality in portable electronic devices. For example, the IR functionality of the present invention may be incorporated in multi-use devices such as mobile phones, PDAs, and mobile computers to provide a user ready access to a device that can serve as a remote controller (e.g., a "Universal" remote controller) in addition to its existing communications and media capabilities. It should be noted, however, that the borders between what can be considered a mobile phone, a mobile computer, a PDA and the like are increasingly becoming less clear because many of such categorized electronic devices may perform some, if not all the functions that may be considered to correspond to one or more devices having a different designated category. Furthermore, the present invention may even be implemented in devices that generally operate at a fixed location, for example, to provide IR signaling to any nearby IR receiver or receiver/repeater combination capable of detecting an IR signal. Thus, aspects of the invention provide a unique and practical way to integrate IR remote control functionality into any of a variety of device types.

The various features of the invention will now be described in connection with exemplary embodiments and with reference to the figures.

Figure 3:
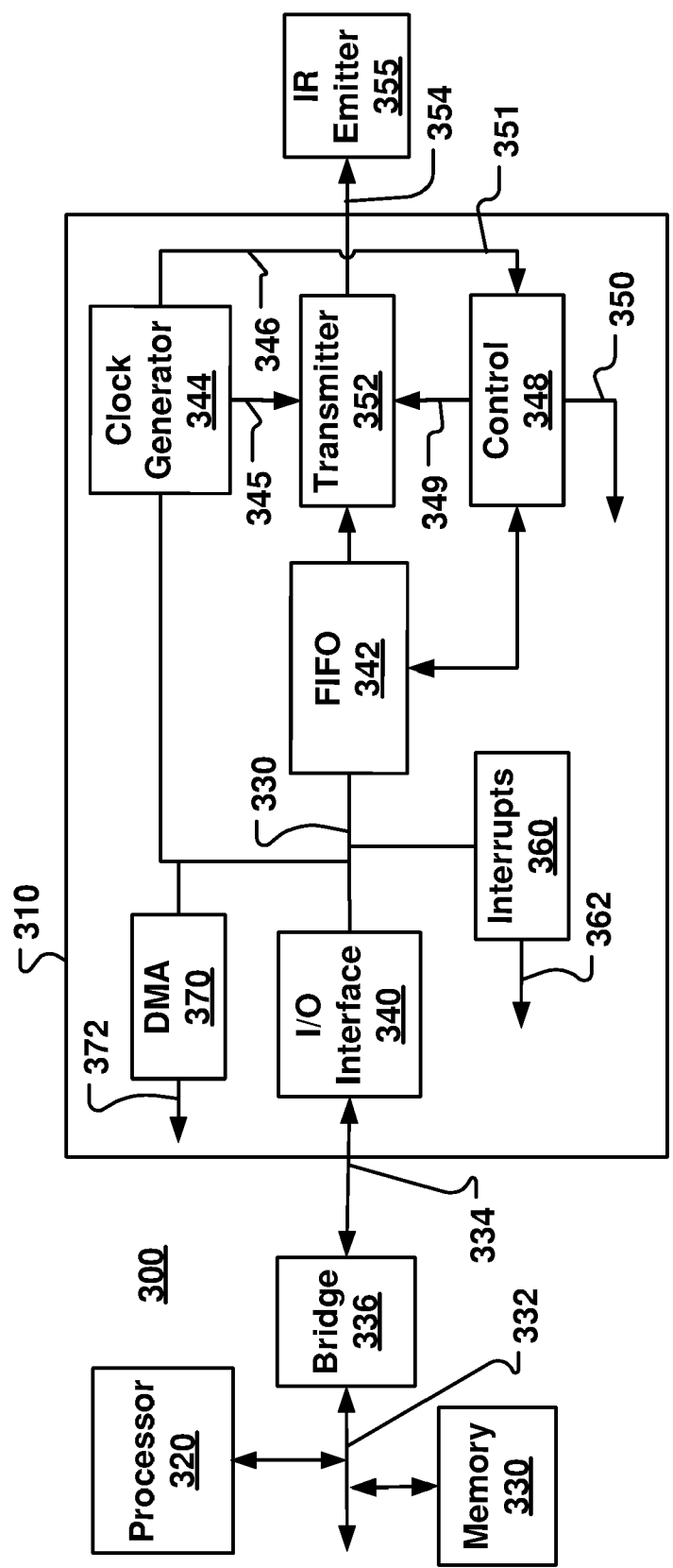
FIG. 3 is a block diagram representing an exemplary system including an infrared signal generator module in accordance with some embodiments.

FIG. 3 is a block diagram illustrating an exemplary system 300 including a signal-generating module 310 for carrier generation and data modulation for IR remote control signaling. The system 300 also includes a processor 320, memory 330, a system bus 332, a peripheral bus 334 and a bridge 336. The system 300 may or may not include additional devices on the system bus 332 and on the peripheral bus 334, but for brevity and practicality of illustration, such devices will not be shown.

The individual hardware elements of the signal-generating module 310, which may comprise general-purpose logic, communicate with one another over a module bus 330. The hardware elements include an input/output (I/O) interface 340, which may include a set of registers where control information is stored; a buffer memory, which may be implemented in some embodiments as a first-in-first-out (FIFO) buffer 342 for storing a plurality of instructions to be sequentially executed, each of which includes at least information corresponding to an on/off value and pulse duration; a clock generator 344 for generating a carrier clock signal 345 and a data (i.e., bit) clock signal 346; control circuit 348; and a transmitter 352 for providing an output signal 354 to an IR emitter 355 (e.g., an IR LED). The output signal is produced by modulating the carrier clock signal 345 based on information contained in the sequentially executed instructions stored in the FIFO buffer 342 and an enabling signal 349 provided by the control circuit 348.

The system bus 332 may be faster than the peripheral bus 334 and linked thereto using a bridge 336 that serves as a master to the "slave" peripheral device (i.e., the signal-generating module 310) and enables communication between devices or components having different protocols. The system bus 332 generally connects high bandwidth devices, such as the processor 320, system memory 330, and other devices such as an external memory interface and DMA controller (not shown), while the peripheral bus 334 supports the high performance, low latency and flexibility issues associated with peripheral devices. Depending on particular implementation, any of several known bus configurations may be used. For example, the signal-generating module 310 may be implemented using Advanced Peripheral Bus (APB) or the peripheral component interconnect (PCI) protocol, while the system bus 332 operates under a different protocol such as an Advanced Microprocessor Bus Architecture (AMBA) High-Speed Bus (AHB) or another known local system bus.

The functionality of IR remote control signaling within the signal-generating module 310 can be broken down into four primary components: carrier clock generation, data encoding, command sequencing, and signal modulation. In most signaling protocols in use today, a modulated signal carrier clock (e.g., a 30 KHz-60 KHz clock signal) is effectively AND'ed with encoded data. The encoded data represents binary digits by varying the pulse width, phase, or time between pulses. This comes down to "when" and "how long" to turn the carrier on and off for each pulse. The present invention includes a combination of hardware and software functionality that allows a generic function in the hardware to be controlled in such a way to support a plurality, if not all variants of IR remote control signaling.

The clock generator 344 may be implemented as a single multi-output clock generator, or as separate clock generating elements for generating the respective carrier clock signal and the data clock signal. The clock generator 344 may have an input to which a clock is supplied by the processor 320 or other source, and the clock generator 344 may produce the carrier and data clock signals based on the input clock signal (e.g., via a clock divider or multiplier, PLL, DDL or other known clock generating circuits). Alternatively, the carrier and data clock signals may be generated locally (e.g., via an oscillator, LC, RC or other known circuits and configurations). Any of these clock generator circuits may be implemented as a programmable clock generator to provide added flexibility in the number of IR signals that the signal-generating module 310 may produce.

The FIFO buffer 342 is used to store modulation instructions, which include information used by the transmitter 352 and controller 348 to determine how to modulate the frequency of the carrier clock 345 provided by the clock generator 344. The FIFO buffer 342 may be supported by an interrupts module 360 that generates an interrupt signal at 362 based on the status of the FIFO buffer 342. For example, an interrupt signal may be triggered by events such as FIFO half empty, FIFO underflow, FIFO empty, FIFO full, and an instruction frame end.

The FIFO buffer 342 is programmed by the processor 320 and stores sets of values that may be viewed as pulse width instructions. These instructions are executed in series and cause the output at 354 to be modulated on or off for the programmed amount of time specified by the instruction. For example, each location in the FIFO buffer may be divided into three fields: "on/off," "valid," and "pulse duration." The "on/ off" field may be a single bit that indicates whether the output should be modulated on or off. The "valid" field may be a single bit that indicates that the current instruction is valid for execution, which may provide a simple means to start and end a series of instructions. The "pulse duration" field may include multiple bits that represent the duration amount of the current instruction in periods of the data clock signal generated by the clock generator 344. The number of bits required for the "pulse duration" field may depend on the input clock rate, a desired granularity of the duration length, and/or the protocols that are to be supported.

The transmitter 352 receives the carrier clock signal 345 from the clock generator 344 and the value stored in the "on/off" field of the instruction. The transmitter 352 uses the "on/off" value to modulate the carrier clock for a period of time corresponding to an assertion of an enable signal 349 by the control circuit 348.

The control circuit 348 receives the data clock 346 from the clock generator 344, and also receives the pulse duration amount and the "valid bit" field value contained in a currently executed instruction stored in the FIFO buffer 342. Based on this information, the control circuit 348 selectively asserts an enable/disable signal 349 to control a respective on/off state of the transmitter 352 (i.e., how long the transmitter 352 modulates the carrier clock signal 346). After a time period corresponding to the duration amount elapses, the control circuit 348 sends an address signal to the FIFO buffer 342 directing the FIFO buffer to load the next instruction in the series. When the control circuit 348 receives a "valid bit" field containing an "invalid" value, the control circuit 348 sends an interrupt signal 350 to the processor 320, disables output from the transmitter 352, and waits for a new instruction to be loaded.

Figure 4:
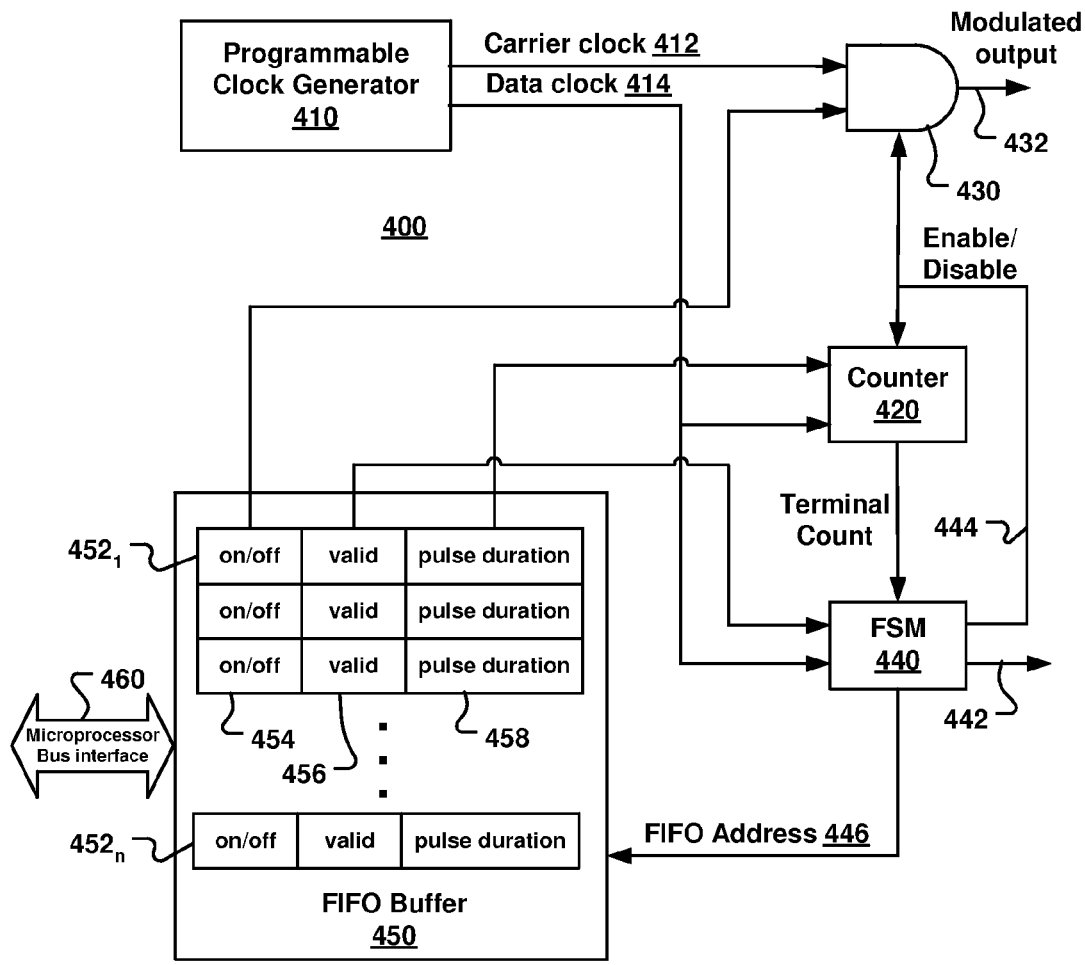
FIG. 4 is a block diagram illustrating the hardware implementation of an exemplary IR signaling generation in accordance with some embodiments.

The signal-generating module 310 may optionally include a direct memory access (DMA) module 370 to provide an interface between the signal-generating module 310 and a DMA controller (not shown) on the system bus 332. The DMA module supports a programmable threshold setting that determines how many elements are left in the FIFO buffer 342 before a DMA request 372 is asserted. The DMA function may be enabled or disabled and is not required for the module to operate. The DMA request 372, the interrupt signal 350 and/or and the interrupt signal 362 may be routed through the I/O interface 340 to the appropriate element on the system bus 332, or alternatively each may communicate with the appropriate system elements by way of one or more dedicated paths FIG. 4 is a logic block diagram illustrating hardware of an exemplary IR signaling generator 400 according to some embodiments. For example, the IR signaling generator 400 may be used in the above signal-generating module 310. The hardware of the IR signaling generator 400 includes a programmable clock generator 410, an automatically-loaded counter 420 that keeps track of pulse durations, a logic function 430 that modulates the carrier on and off, a finite state machine (FSM) 440 for controlling a sequence of operations, a FIFO buffer 450 for storing pulse width instructions, and a microprocessor bus interface 460 including a set of control registers.

The programmable clock generator 410 may be any suitable known clock generator, such as those based on a clock divider, PLL, DLL, and the like, which derives a carrier clock signal 412 having a desired carrier frequency from a clock signal input to the generator (e.g., a clock signal typically available in a microprocessor-based system) and a data clock having a frequency based on the carrier clock signal. Alternatively, some embodiments may utilize any known programmable clock generating mechanism that generate the carrier clock locally independent of a system clock, and the clock generator may be implemented as separate clock generating elements for generating respective carrier clock signal and a data clock signal.

Figure 2A:
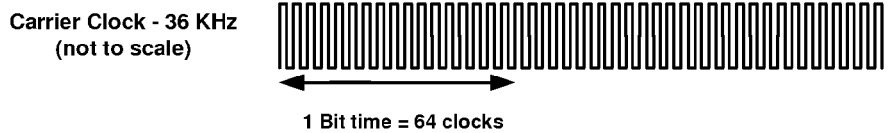
FIGS. 2a-2d are diagrams illustrating a bi-phase encoding scheme and protocol for representing infrared signaling data.
Figure 2B:
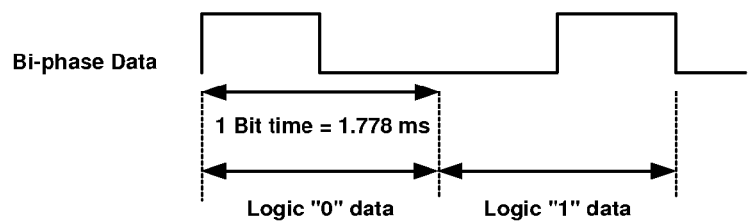
Figure 2C:
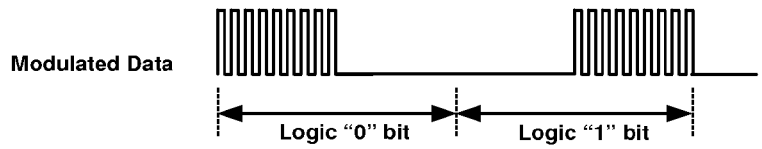
Figure 2D:
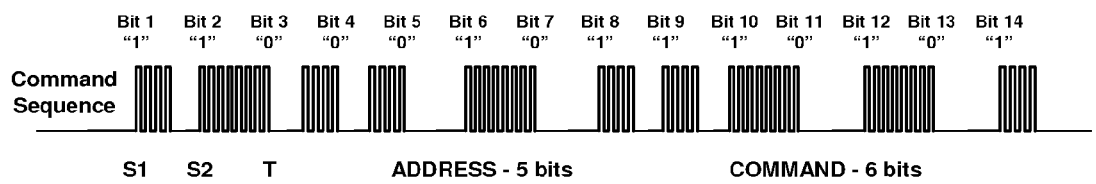

The data clock signal 414 generated by the programmable clock generator 410 may have a frequency equal to or less than the carrier clock frequency. For example, the bi-phase coding scheme shown in FIG. 2b has a carrier frequency of 36 KHz and a full bit time defined as 64 cycles of the carrier clock. The bi-phase pulse widths in this example would be equal to 32 carrier clocks. In this case, the data clock may be programmed to output a frequency of, for example, 36 KHz, 18 KHz or 9 KHz. Lower data clock rates are possible as long as there is enough resolution to create a desired pulse width duration.

The FIFO buffer 450 is programmed by a microprocessor (not shown) and stores pulse width instructions in the FIFO elements $452_1$ to $452_n$. Each of the FIFO elements $452_1$ to $452_n$ is divided into an "on/off" bit field 454, a "valid" bit field 456, and a "pulse duration" bit field 458. The on/off field 454 may be a single bit that represents the encoded data and indicates whether the output should be modulated on or off. The encoded data stored in bit field 454 is supplied to the logic function 430, which is an AND gate in this embodiment. The valid field 456 may be a single bit indicating whether the current instruction is valid for execution and is provided to an input of the FSM 440. The pulse duration field 458 includes multiple bits and represents the duration of the current instruction in periods of the data clock 414. The number of bits required for the pulse duration field 458 is dependent on the input clock rate and the protocols that are to be supported.

In the FIG. 4 embodiment, a control circuit is implemented in the form of a counter 420 and an FSM 440, and controls the execution of the instructions stored in the FIFO buffer 450. Once an instruction is loaded into the FIFO buffer 450, the FSM 440 reads the state of the valid bit 456. If the valid bit 456 is set, the FSM 440 enables the output 432 of the modulator. The pulse duration value 458 is loaded into the counter 420, which then decrements every period of data clock 414. The counter 420 reaching zero is an indication to the FSM 440 that it should load the next instruction using a FIFO address signal 446. This process continues until an instruction is loaded with the valid bit 456 not set. At that point, the FSM 440 generates and sends an interrupt signal 442 to the microprocessor, provides a disable signal to an enable/disable function of the logic function 430 along signal path 444, and waits for a new instruction to be loaded.

The logical implementation of the IR signal generator described herein handles the carrier clock generation and modulation based on pulse duration instructions provided by the processor (e.g., microprocessor). This implies that the actual protocol encoding and command sequencing is performed in software or firmware. For example, if the software were to send a command using the protocol described in FIGS. 2a-2d, it would first assemble a series of bits that represent the command in the proper order. The software or firmware would then translate each bit of the series into two instructions, each one representing one phase of the bi-phase encoding. In the FIG. 4 embodiment, for example, the on/off value 454 of each instruction would be determined by the value of each bit and by which phase the instruction represents. In this example, a logic "0" bi-phase encoded bit would require that the first instruction have an on/off value 454 of "1," and a second instruction would have an on/off value 454 of "0." A logic "1" bi-phase encoded bit would be translated into two sequential instructions, the first having an on/off value 454 of "0" and the second having an on/off value 454 of "1." In a bi-phase implementation, all pulse duration values 458 would have the same value and depend on what frequency was programmed for the data clock 414. For example, if the data clock 414 were equal to the carrier clock 412, the durations would all be 32 clock cycles of the data clock 414.

In a similar manner, virtually any protocol, such as those utilizing pulse-width and pulse-position encoding, could be supported by appropriately varying the values for the carrier clock 412 and data clock 414, converting the command bits into the appropriate series of "on" and "off" pulses, and setting the appropriate respective pulse durations.

Figure 1C:
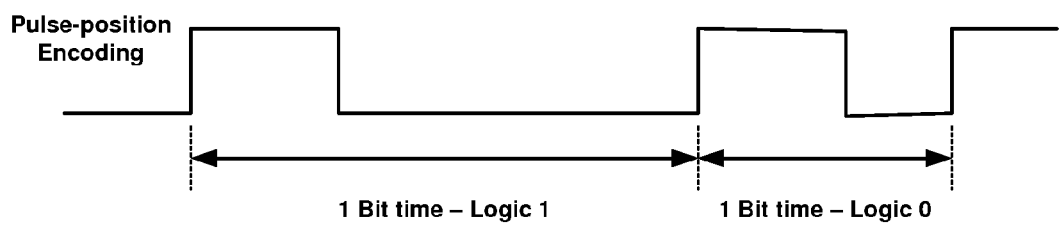

For example, to generate an IR signal using the pulse-width encoding scheme of FIG. 1a, each logic bit value may be implemented with two instructions, one to designate the "on" time, and another to designate the "off" time. The pulse duration (i.e., duty cycle) of the "on" value of the on/off value 454 would be longer to represent a binary "1" than it would be to represent a binary "0." In this example, the "off" value of the on/off value 454 for both "1" and "0" would have the same pulse duration 458. The pulse-position encoding shown in FIG. 1c would be similarly performed, but with each instruction 452 of an instruction pair having the same pulse duration value 458 when an on/off value 454 is "on," and one of two different pulse duration amounts for each "off" value of an on/off value 454 that correspond to the bit logic value.

The present invention also may generate signals for protocols that may include multi-valued information beyond simple binary values. For example, the number of pulse width durations possible in a coded sequence would be limited only by the number of carrier clock and/or data clock frequencies a clock generator can generate, and a resolution that may be required for a particular bit time. In this way, the invention provides for protocols using more than two different pulse widths of either the "on" or "off" value of the on/off bit field 454.

Although some embodiments described herein utilize software or hardware to generate instructions that include a pulse width duration value, the software or hardware may instead generate instructions that contain information linking or pointing to a location storing a pulse duration value. For example, pulse durations corresponding to each "off" and "on" on/off value may be defined and stored in one or more register, and the "on" or "off" value in the on/off bit field of an instruction or an additional bit field in an instruction may serve as a pointer to a register containing the corresponding pulse duration value. For example, in the case of an "on/off" value having only one or two duration values, an on/off bit itself may point to the appropriate register. In the case of an encoding scheme including more than one possible pulse duration value for an "on" and "off" value of an on/off value, more than one bit may be used for each "on" and/or "off" value, or an additional field may be included in an instruction to point to a register containing the appropriate pulse duration value. For example, the pulse-width encoding shown in FIG. 1a includes two possible pulse duration values for an "on" on/off value and only one pulse duration value for an "off" on/off value. Similarly, the pulse-position encoding shown in FIG. 1c includes only one possible pulse duration value for an "on" on/off value and two possible pulse duration values for "off" on/off value. For such multi-valued "on" and "off" values, the number of bits in an instruction may correspond to the number of registers required for a particular encoding scheme. Thus, while an instruction may not include an actual pulse width duration value, it may convey information corresponding to a desired pulse width duration.

The present invention has significant advantages over current implementations in which all or most of the functionality is realized in software. For example, partitioning the functionality between hardware (e.g., logic gates) and software (or firmware) allows the hardware to handle fixed functions that must operate at a high frequency with a fair amount of timing precision, while variable functions that can be calculated prior to modulation may be handled by software or firmware. The hardware also provides enough functionality to significantly off-load the processor as compared to the existing solutions. The hardware also may be generic with respect to the various modulation and encoding schemes that exist in industry, and thus provides greater overall flexibility than the all software approach of the prior art. Additionally, the hardware solution of the present invention is not prohibitively costly in logic area or power consumption for a portable communications/computing device application.

In addition, the invention allows the software (or firmware) to operate with virtually no real-time constraints and provide maximum flexibility for supporting various protocols. Because the software (or firmware) assembles the commands and implements the encoding scheme, it facilitates support for many protocol variants. When integrating this function into an existing microprocessor system (e.g., a microprocessor system of a cell phone or PDA), it will not represent a significant processing load or impose any real-time constraint. Additionally, the present invention does not impose an impact on circuit board area because it does not require adding a separate microcontroller.

This invention also has an advantage over possible solutions that would put all the functionality into hardware. An all-hardware solution would have much greater complexity in order to support all the common encoding schemes and command sequences, which would result in a much larger (thus more costly) and more power-hungry design. Also, an all-hardware design would be less flexible and adaptable, depending on lengthy ASIC design cycles to modify or add functions.

Another advantage of the present invention over conventional methods and configurations is the pulse width instruction over a simple bit stream. The conventional methods and configurations would not be as efficient when implementing a pulse-width or pulse-position modulation scheme, particularly when the pulse durations require fine granularity with respect to the bit time. For example, in some existing hardware solutions, each bit represents an "on" or "off" time of one period of the bit clock. If the encoding scheme requires pulse widths that vary with a high granularity, the bit clock must be programmed to be a significantly higher rate than the actual bit time. Therefore, more data bits must be transferred by the microprocessor for each logical value. This invention is an improvement over such systems because, regardless of the encoding scheme or the frequency of the data clock, only one pulse-width instruction is needed for each pulse. This lessens real-time constraint on the microprocessor and simplifies control.

Also, most IR remote control protocols require a certain amount of "off" time between commands that is typically much longer than a single bit time. Since commands are often repeated as the user holds a button down, e.g. "Fast-forward," or "Volume Down," such conventional implementations would have to program a long string of 0's to cause the appropriate "off" time to occur. Alternatively, the hardware would have to be disabled for the period of the inter-command "off" time, which means it would have to be tracked by software. With this invention, the inter-command "off" time can be programmed with a single instruction just like any other pulse.

Figure 5:
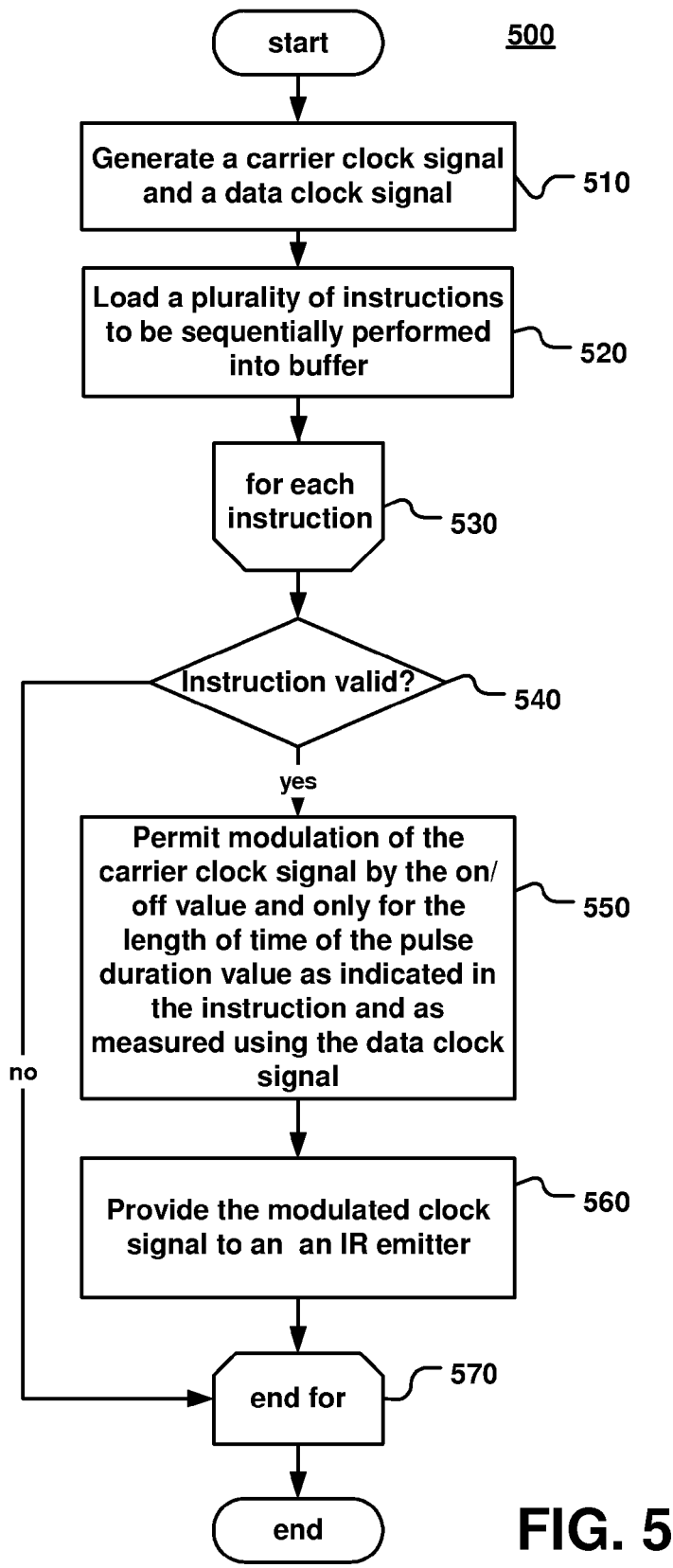
FIG. 5 is a flowchart illustrating exemplary processes related to generating an infrared signal in accordance with some embodiments.

With reference to FIG. 5, there is shown a procedure 500 for generating an infrared (IR) signal in accordance with some embodiments. The procedure 500 begins at process 510, which generates a carrier clock signal and a data clock signal. The frequency of the data clock signal may be less than or equal to the frequency of the carrier clock signal.

In process 520, a buffer memory, such as a FIFO buffer, is loaded with a plurality of instructions to be sequentially performed. For example, the instructions may be loaded by a microprocessor of a system performing signal IR generation. The instructions represent an encoded data sequence, which may be calculated by software or firmware, and each instruction includes a corresponding value related to an on or off (on/off) value that indicates whether the output should be modulated on or off with respect to the carrier clock, and information indicating a pulse duration value, which is a length of time that the modulation is to be performed. The instructions also may include a value indicating whether the instruction is valid, which may be utilized, for example, to indicate an end of the sequence of instructions.

Process 530 represents a loop that executes processes 540 to 560 for each instruction stored in the buffer memory in a sequence corresponding to the encoding method utilized. In decision 540, it is determined whether the instruction is valid, and if not, the loop ends. At this point, the sequence of instructions have completed so modulation of the carrier signal may be disabled, and an interrupt signal may be generated and sent to the microprocessor.

If the instruction includes a valid indicator, process 550 permits modulation of the data clock signal by the on/off value included in the instruction only for the length of time indicated by the pulse duration value. The length of time is measured using the data clock signal, for example, providing the data clock to a control circuit that includes a counter, which counts down from a value initially set at the pulse duration value.

In process 560, the modulated carrier clock signal is provided to an IR emitter. The loop 530 repeats processes 530 to 560 until all loaded instructions have been exhausted and the "end for" 570 condition occurs, which may include processing an instruction having an invalid indicator at 540 causes the control circuit to disable modulation and send an interrupt signal to the microprocessor.

It will be apparent to those skilled in the art that various changes and modifications can be made in the infrared remote control signaling generating method and configuration of the present invention without departing from the spirit and scope thereof. Thus, it is intended that the present invention cover the modifications of this invention provided they come within the scope of the appended claims and their equivalents.

What is claimed is:

1. A method for generating an infrared (IR) signal, comprising:
    generating a carrier clock signal and a data clock signal, wherein the data clock signal frequency is less than or equal to the carrier clock signal frequency;
    loading into a buffer a plurality of instructions to be performed in sequential order, each said instruction for producing an element in an encoded data sequence and including corresponding values indicating an on or off value for modulating the carrier clock signal and information corresponding to a pulse duration value; and
    executing each instruction in the sequential order by performing:
        applying the corresponding pulse duration value to a control circuit that permits the modulation only for a length of time indicated by the pulse duration value as measured using the data clock signal;
        modulating the carrier clock signal with the corresponding on or off value for the indicated length of time; and
        providing the modulated carrier clock signal to an IR emitter,
    wherein each instruction further comprises validity information indicating whether that instruction is valid, and the method further comprises:
        providing the validity information to the control circuit;
        determining whether the validity information for an instruction indicates the instruction is invalid; and
        disabling modulation of the carrier clock signal if the validity information indicates an invalid instruction.

2. The method of claim 1, wherein the control circuit includes a finite state machine that receives the validity information, and said disabling modulation of the carrier clock signal is performed by the finite state machine.

3. The method of claim 1, wherein:
    the control circuit includes a counter;
    the pulse duration value and the data clock are provided to the counter; and
    the control circuit causes the buffer to load the next instruction in the sequence after the counter counts an amount equal to the indicated length of time.

4. An infrared (IR) signal generating apparatus, comprising:
    a clock generator for generating a carrier clock and a data clock, said data clock having a frequency equal to or less than a frequency of the carrier clock;
    a buffer memory for loading a plurality of instructions for execution, each said instruction for producing a sequential part of an encoded data sequence and including corresponding values indicating an on or off value for modulating the carrier clock and information corresponding to a pulse duration value;
    a modulator for receiving the carrier clock signal and the on or off value during execution of each said instruction and for modulating the carrier clock signal with the on or off value and for providing the modulated carrier clock as an output to an IR emitter; and
    a control circuit that receives the pulse duration value and data clock signal, and permits said modulation only for a length of time indicated by the pulse duration value as measured using the data clock signal,
    wherein:
    each instruction further comprises validity information indicating whether that instruction is valid; and
    the control circuit determines whether the validity information for an instruction indicates the instruction is invalid, and if so, disables the modulation of the carrier clock signal.

5. The IR signal generating apparatus according to claim 4, wherein:
    the control circuit includes a finite state machine that receives the validity information; and
    said disabling modulation of the carrier clock signal is performed by the finite state machine.

6. The IR signal generating apparatus according to claim 4, wherein:
    the control circuit includes a counter;
    the information corresponding to a pulse duration is the pulse duration value, and pulse duration value and the data clock are provided to the counter; and
    the control circuit causes the buffer to load the next instruction in the sequence after the counter counts an amount equal to the indicated length of time.

7. The IR signal generating apparatus according to claim 4, wherein:

the control circuit includes a counter;

the information corresponding to a pulse duration length of time points to a memory location storing a pulse duration value, and the pulse duration value and the data clock are provided to the counter; and the control circuit causes the buffer to load the next instruction in the sequence after the counter counts an amount equal to the indicated length of time value.

8. The IR signal generating apparatus according to claim 4, wherein:

the modulator includes an AND logic gate;

the AND logic gate has two inputs that receive the carrier clock signal and the on or off value of the executing instruction, respectively; and;

the AND logic gate supplies the modulated carrier signal at an output of the AND logic gate.

9. The IR signal generating apparatus according to claim 4, wherein the clock generator is a programmable clock generator.

10. The IR signal generating apparatus according to claim 4, wherein the modulated carrier clock signal is one of a pulse-width encoded signal, a bi-phase encoded signal and a pulse-position encoded signal.

* * * * *

UNITED STATES PATENT AND TRADEMARK OFFICE
CERTIFICATE OF CORRECTION

PATENT NO. : 8,027,592 B2  
APPLICATION NO. : 11/963744  
DATED : September 27, 2011  
INVENTOR(S) : Fugaro et al.

Page 1 of 1

It is certified that error appears in the above-identified patent and that said Letters Patent is hereby corrected as shown below:

In Column 1, Line 54, delete ""“0"”" and insert -- "0" --, therefor.

In Column 6, Line 66, delete "FlFO" and insert -- FIFO --, therefor.

In Column 8, Line 16, delete "FlFO" and insert -- FIFO --, therefor.

In Column 8, Line 35, delete "FlFO" and insert -- FIFO --, therefor.

In Column 8, Line 41, delete "FlFO" and insert -- FIFO --, therefor.

In Column 14, Line 3, in Claim 8, delete "and;" and insert -- and --, therefor.

Signed and Sealed this  
Twentieth Day of March, 2012

David J. Kappos  
*Director of the United States Patent and Trademark Office*